(12) United States Patent
Stiner

(10) Patent No.: US 6,283,392 B1
(45) Date of Patent: Sep. 4, 2001

(54) FISHING REEL WITH OSCILLATING ASSEMBLY FOR DISTRIBUTING LINE EVENLY ON A SPOOL

(75) Inventor: Roy E. Stiner, Tulsa, OK (US)

(73) Assignee: Brunswick Corporation, Tulsa, OK (US)

( * ) Notice: Subject to any disclaimer, the term of this patent is extended or adjusted under 35 U.S.C. 154(b) by 0 days.

(21) Appl. No.: 09/484,885

(22) Filed: Jan. 18, 2000

(51) Int. Cl.$^7$ .................................................. A01K 89/01
(52) U.S. Cl. ........................... 242/241; 74/32; 242/476.7
(58) Field of Search .................................... 242/241, 242, 242/FOR 145, FOR 189, 476.7; 74/32

(56) References Cited

U.S. PATENT DOCUMENTS

| | | | |
|---|---|---|---|
| 1,601,188 | * | 9/1926 | Nagel ........................................ 74/32 |
| 2,687,855 | * | 8/1954 | Shakespeare et al. ................. 242/241 |
| 3,094,296 | * | 6/1963 | Nurmse ................................. 242/242 |
| 3,298,630 | * | 1/1967 | Taggart ................................. 242/241 |
| 4,512,531 | * | 4/1985 | Tunoda ................................. 242/241 |
| 5,528,946 | * | 6/1996 | Yadegar ................................... 74/32 |
| 5,921,489 | * | 7/1999 | Shibata ................................. 242/242 |

* cited by examiner

Primary Examiner—Katherine A. Matecki
(74) Attorney, Agent, or Firm—Wood, Phillips, VanSanten, Clark & Mortimer

(57) ABSTRACT

A fishing reel having a frame and an operating mechanism on the frame. The operating mechanism has a line carrying spool that is movable guidingly and reciprocatingly in a first path in first and second opposite directions, a bail assembly which is rotatable around a first axis to direct line onto the line carrying spool, a drive element that is operable to rotate the bail assembly, and an oscillating assembly. The oscillating assembly is driven by operation of the drive element and thereby causes the line carrying spool to move in the first path. The oscillating assembly has a first gear element that is rotatably driven by operation of the drive element around a second axis that is transverse to the first axis and a second gear element that is in mesh with the first gear element. The second gear element extends both a) in the first direction beyond the second axis and b) in the second direction beyond the second axis as the fishing reel is operated.

22 Claims, 4 Drawing Sheets

FISHING REEL WITH OSCILLATING ASSEMBLY FOR DISTRIBUTING LINE EVENLY ON A SPOOL

BACKGROUND OF THE INVENTION

1. Field of the Invention

This invention relates to fishing reels of the type having an oscillating assembly which reciprocates as line is being retrieved to cause the line to be distributed evenly over the spool.

2. Background Art

Geared oscillating assemblies in fishing reels have been used and, of late, improved, so that retrieved line is distributed quite evenly over a spool. An exemplary system is shown in FIG. 6 herein on a spinning-type fishing reel at 10. The reel 10 has a frame 12 on which an operating mechanism at 14 is mounted.

The operating mechanism 14 consists of a rotor assembly 16 with a rotor body 18 having a base portion 20 and diametrically oppositely located ears 22, 24 projecting forwardly from the base portion 20.

The rotor body 18 supports a bail assembly at 26. The bail assembly 26 consists of bail arms 28, 30, mounted one each to the rotor ears 22, 24, for pivoting about an axis 32. A bail wire 34 connects fixedly between the bail arms 28, 30 so that the bail arms 28, 30 and bail wire 34 move as one piece around the axis 32. A line guide 36 is mounted at the juncture between one end 38 of the bail wire 34 and the bail arm 28.

Rotation of the rotor assembly 16 around a fore and aft axis 40 is imparted by an external crank handle 42. The crank handle 42 drives a face gear 44 around an axis 45 that is orthogonal to the axis 40. The face gear 44 in turn drives a pinion gear 46 on a shaft 48 that is fixed to the base portion 20 of the rotor body 18.

A shaft 50, which carries the face gear 44, also carries a concentric gear 52, which is in mesh with an oscillation gear 54 on an oscillating assembly 56 that is part of the operating mechanism 14. The oscillation gear 54 is mounted to the frame 12 for rotation around an axis 58 that is parallel to the axis 45 of the face gear 44. The oscillation gear 54 has a laterally projecting pin 60 which is offset from the axis 58 and cooperates with a slotted follower 62. The follower 62 is fixed to a shaft 64, which is slidably received within the shaft 48 and connects at its forward region to a line carrying spool 66. The follower 62, shaft 64, and spool 66 move as a unit in the fore and aft direction along the axis 40.

The follower 62 has a rectangular body 68 with an elongate slot 70 therein extending over the majority of its vertical extent. The slot 70 receives the pin 60 and is dimensioned so that the pin 60 is guidingly movable smoothly, without interference, along the length thereof.

In operation, as the crank handle 42 is advanced by a user in the direction of the arrow 72, the gear 52 is driven in the direction of the arrow 74 around the axis 45. This in turn causes the oscillation gear 54, in mesh therewith, to be driven around the axis 58 in the direction of the arrow 76. As this occurs, the pin 60 on the oscillation gear 54 bears on a vertical straight edge 78 bounding the slot 70 to drive the follower 62, and the shaft 64 fixed thereto, rearwardly, i.e, to the left in FIG. 6, along the axis 40. The pin 60 slides vertically downwardly in the slot 70 as the crank handle 42 is operated progressively until realizing the position shown at A. Continued rotation of the gear 54 in the direction of the arrow 76, with the pin 60 in the A position, causes the pin 60 to bear on the opposite vertical edge 80 bounding the slot 70. The pin 60 moves progressively downwardly in the slot 70 to the position shown at B. In transition from the A position to the B position, the pin 60 drives the follower 62 and shaft 64 forwardly. Continued rotation causes the pin 60 to bear forwardly on the edge 80 as it moves upwardly from the B position to the C position, at which point the pin 60 bears again against the edge 78 to move the follower 62 and shaft 64 rearwardly until the pin 60 again reaches the A position. Continuous rotation of the crank handle 42 causes the repetitive, reciprocating movement of the follower 62, shaft 64, and spool 66. The distance between the A and C positions represents the "stroke length" for the follower 62, shaft 64, and spool 66.

At the same time as this oscillation is occurring, the face gear 44, through the pinon gear 46, is driving the rotor assembly 16 in rotation around the axis 40. As this occurs, the bail assembly 26 causes line to be wrapped around the reciprocating spool 66.

In the event that it is desirable to increase the stroke length for the follower 62, shaft 64, and spool 66, the diameter of the gear 54 must be increased, as must the length of the follower 62 and slot 70. By doing so, the lengthwise and vertical dimensions of the reel 10 necessarily increase, which is undesirable.

SUMMARY OF THE INVENTION

In one form, the invention is directed to a fishing reel having a frame and an operating mechanism on the frame. The operating mechanism has a line carrying spool that is movable guidingly and reciprocatingly in a first path in first and second opposite directions, a bail assembly which is rotatable around a first axis to direct line onto the line carrying spool, a drive element that is operable to rotate the bail assembly, and an oscillating assembly. The oscillating assembly is driven by operation of the drive element and thereby causes the line carrying spool to move in the first path. The oscillating assembly has a first gear element that is rotatably driven by operation of the drive element around a second axis that is transverse to the first axis and a second gear element that is in mesh with the first gear element. The second gear element extends both a) in the first direction beyond the second axis and b) in the second direction beyond the second axis as the fishing reel is operated.

In one form, the line carrying spool is moveable in the first path along a first line that is coincident with the first axis.

The first axis may be substantially orthogonal to the second axis.

The second gear element may have a first line of gear teeth.

In one form, the first line of gear teeth extends along a line that is substantially parallel to the first axis.

The second gear element may have a second line of gear teeth spaced from the first line of gear teeth.

In one form, the first line of gear teeth and second line of gear teeth each extend along a line that is substantially parallel to the first axis.

In one form, the first and second lines of gear teeth are connected by an arm so that the arm and first and second lines of gear teeth cooperatively define a U shape.

In one form, the first gear element has an array of teeth that repetitively engages and disengages the first line of gear teeth as the first gear element rotates around the second axis.

The array of gear teeth may extend in a curved path around the second axis through less than 360° around the second axis.

In one form, the array of teeth around the first gear element alternatingly a) engages the first line of gear teeth and disengages the first line of gear teeth and b) engages the second line of gear teeth and disengages the second line of gear teeth as the first gear element rotates around the second axis. The first gear element engaged with the first line of gear teeth causes the line carrying spool to move in the first direction in the first path as the first drive gear is rotated in one direction around the second axis. The first gear element engaged with the second line of gear teeth causes the line carrying spool to move in the second direction in the first path as the first drive gear is rotated in the one direction around the second axis.

In one form, the gear element has an array of gear teeth that extend through less than approximately 180° around the second axis.

The drive element may be a crank handle that is engageable by a user and rotatable about an axis parallel to the second axis.

In one form, the axis about which the crank handle is rotatable is substantially coincident with the second axis.

The invention is also directed to a fishing reel having a frame and an operating mechanism on the frame. The operating mechanism has a line carrying spool that is moveable guidingly and reciprocatingly in a first path in first and second opposite directions, a bail assembly which is rotatable around a first axis to direct line onto the line carrying spool, a drive element that is operable to rotate the bail assembly, and an oscillating assembly. The oscillating assembly is driven by operation of the drive element to thereby cause the line carrying spool to move reciprocatingly in the first path. The oscillating assembly has a first gear element with teeth that is rotatable around a second axis that is transverse to the first axis and a second gear element with a first set of gear teeth. The teeth on the first gear element are engageable with the first set of gear teeth on the second gear element to cause the line carrying spool to move reciprocatingly in the first direction in the first path, and disengagable from the first set of gear teeth on the second gear element so that the line carrying spool is not caused to move in the first direction as the first drive gear is rotated in one direction around the second axis.

In one form, the second gear element has a second set of gear teeth that is not contiguous with the first set of gear teeth. The teeth on the first gear element are engageable with the second set of gear teeth on the second gear element with the teeth on the first gear element disengaged from the first set of gear teeth on the second gear element to cause the line carrying spool to move in the second direction in the first path.

The first and second sets of gear teeth on the second gear element may be in fixed relationship to each other.

In one form, the first set of gear teeth extends along a line that is substantially parallel to the first axis.

The first set of gear teeth may extend along a first line, with the second set of gear teeth extending along a second line, spaced from and substantially parallel to, the first line.

In one form, the first and second sets of gear teeth are connected by an arm so that the first and second sets of gear teeth and arm cooperatively define a U shape, with the second axis extending through the U defined by the first and second sets of gear teeth and arm.

DETAILED DESCRIPTION OF THE DRAWINGS

Figure 1:
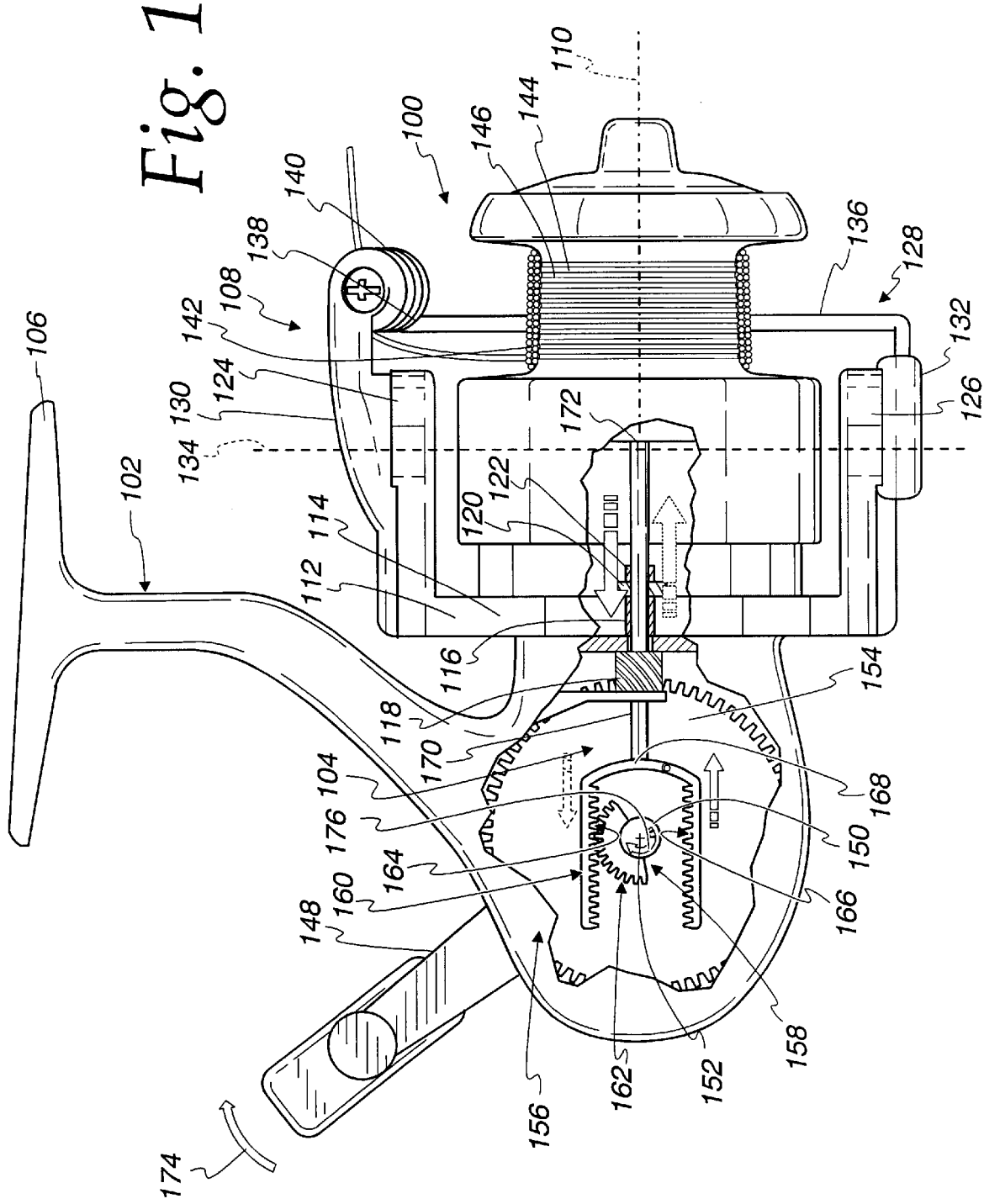
FIG. 1 is a side elevation view of a spinning-type fishing reel incorporating a spool oscillating assembly, according to the present invention.

Referring initially to FIG. 1, a spinning-type fishing reel, suitable for incorporation of the present invention, is shown at 100. The fishing reel 100 consists of a frame 102, upon which an operating mechanism 104 is mounted. The frame 102 defines a mounting foot 106 which facilitates attachment of the fishing reel 100 to a fishing rod (not shown).

The reel 100 consists of a rotor assembly 108 mounted to the frame 102 for rotation relative thereto about a fore and aft axis 110. The rotor assembly 108 consists of a rotor body 112 with a base portion 114 attached to a shaft 116, which is journalled for rotation relative to the frame 102. The shaft 116 has a pinion gear 118 fixed at one end thereof. A nut 120 is threaded to the opposite end 122 of the shaft 116 to maintain the rotor body 112 in an operative position on the frame 102.

The rotor body 112 has a conventional construction with diametrically opposite ears 124, 126 projecting forwardly from the base portion 114. The ears 124,126 support a bail assembly 128 consisting of bail arms 130, 132, mounted one each to the bail ears 124, 126 for pivoting movement about an axis 134 that is orthogonal to the axis 110. The bail assembly 128 further has a bail wire 136 fixedly connected at its ends to the bail arms 130, 132 so that the bail wire 138 and arms 130, 132 move as one piece around the axis 134. The one bail wire end 138 is connected to the bail arm 130 through a line guide 140.

Line 142, wrapped around a reduced diameter portion 144 of a line carrying spool 146, extends around the line guide 140 and forwardly therefrom to and through eyelets associated with a fishing rod (not shown). Rotation of the rotor assembly 108 around the axis 110 causes the line guide 140 to wrap the line 142 around the spool 146.

Rotation of the rotor assembly 108 is effected through a drive element, which in this case is a crank handle 148. The crank handle 148 has a shaft 150 with a laterally extending, rotary axis 152, that is orthogonal to the axis 110. The shaft 150 carries a face gear 154 which meshes with the pinion gear 118 to convert rotation of the face gear 154 around the axis 152 to rotation of the pinion gear 118 around the axis 110. Rotation of the pinon gear 118 in turn drives the rotor assembly 108 attached to the shaft 116.

To understand the present invention, it is only necessary to understand the above basic operation. Further details of a similar reel are described in U.S. Pat. No. 5,040,743, incorporated herein by reference. The structural and operational details could vary considerably from those shown and described in U.S. Pat. No. 5,040,743, while still permitting incorporation of the inventive concept.

The present invention is concerned with an oscillating assembly at 156, as shown in FIG. 1 and in greater detail in FIGS. 2–5. The oscillating assembly 156 is designed to move the line carrying spool 146 reciprocatingly in a path in a fore and aft direction, i.e., left to right along the axis 110, as the rotor assembly 108 is rotated about that same axis. As a result, the retrieved line 142 lays evenly upon the reduced diameter portion 144 of the spool 146 in operation.

The oscillating assembly 156 consists of a first gear element 158, attached to the shaft 150 for rotation around the axis 152, and a cooperating second gear element 160. The first gear element 158 consists of a curved array of teeth 162 extending through less than 360°, and more preferably through less than approximately 180°, around the axis 152. In operation, the teeth 162 alternatingly mesh with a first line of gear teeth 164 on the second gear element 160 and a second line of gear teeth 166 on the second gear element 160, that is spaced from and parallel to the first line of gear teeth 164, with the lines of the gear teeth being substantially parallel to the axis 110.

The first line of gear teeth 164 and second line of gear teeth 166 are joined through an arm 168, so that the arm 168 and first and second lines of gear teeth 164, 166 are in fixed relationship and cooperatively define a U shape, opening in a rearward direction, i.e., from right to left on the reel 100 in FIG. 1.

The arm 168 connects to a shaft 170 which is guided within the shaft 116 for movement relative to the frame 102 along the axis 110. The forward end 172 of the shaft 170 attaches to the spool 146 in such a manner that the spool 146 and shaft 170 move along the axis 110 unitarily as one piece.

In operation, the crank handle 148 is moved by the operator in the direction of the arrow 174 around the axis 152. As this occurs, the face gear 154 is driven around the axis 152 and causes the rotor assembly 108 to rotate around the axis 110. Simultaneously, the first gear element 158 rotates in the direction of the arrow 176 around the axis 152.

Figure 2:
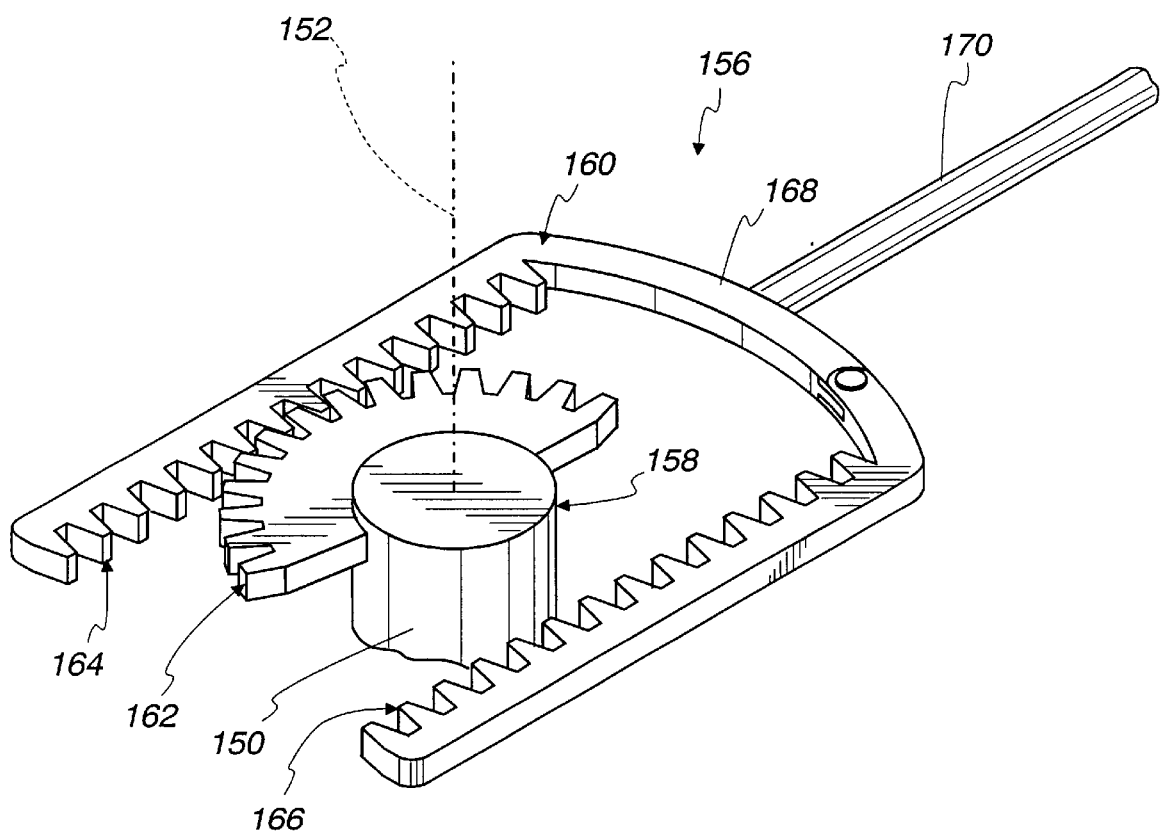
FIG. 2 is an enlarged, fragmentary, perspective view of part of the oscillating assembly of FIG. 1.
Figure 3:
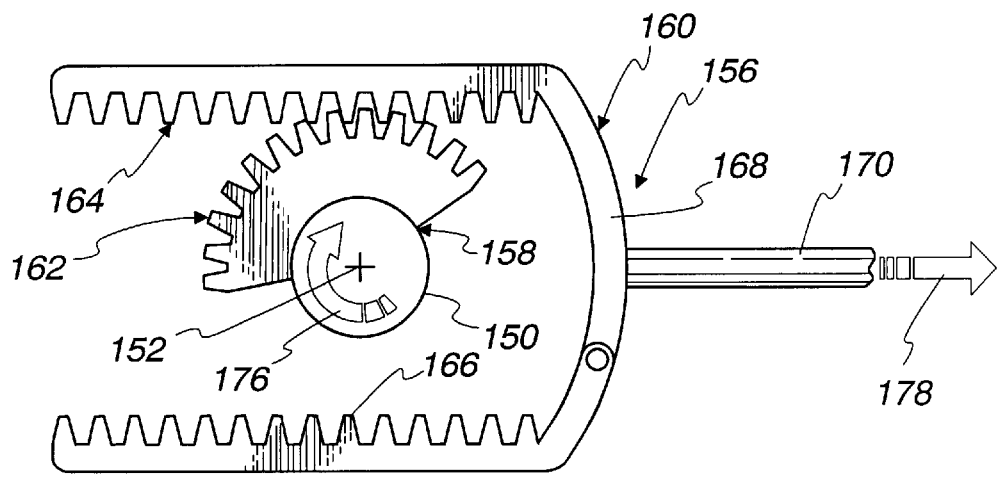
FIG. 3 is a side elevation view of the part of the oscillating assembly in FIG. 2 with the reel being operated to move the spool in a forward direction.

With the first and second gear elements 158, 160 in the relationship shown in FIGS. 1–3, rotation of the first gear element 158 in the direction of the arrow 176 causes the teeth on the gear elements 158, 160 to cooperate so that the second gear element 160 advances forwardly in the direction of the arrow 178 in FIG. 3 along the axis 110. This effects a forward shifting of the shaft 170, carried by the second gear element 160, and the spool 146, carried at the forward end 172 of the shaft 170.

Figure 4:
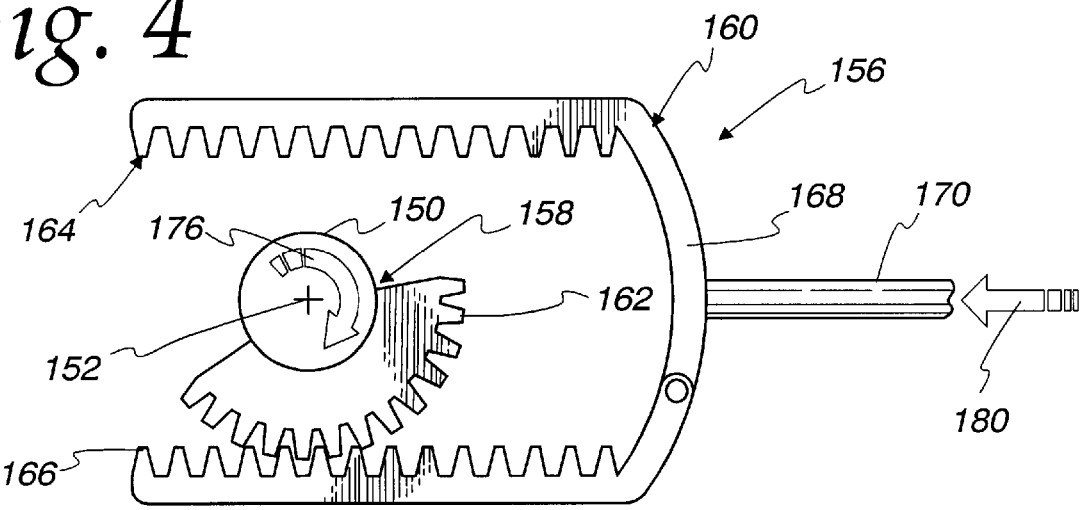
FIG. 4 is a view as in FIG. 3 with rearward movement of the spool taking place.

Continued rotation of the first gear element 158 in the direction of the arrow 176 causes the teeth 162, 164 to disengage and the teeth 162, 166 to engage, as shown in FIG. 4. As this occurs and the first gear element 158 continues to rotate in the direction of the arrow 176, the first and second gear elements 158, 160 cooperate to cause a rearward shifting of the second gear element 160 in the direction of the arrow 180 in FIG. 4, which effects a corresponding rearward movement of the spool 146.

Figure 5:
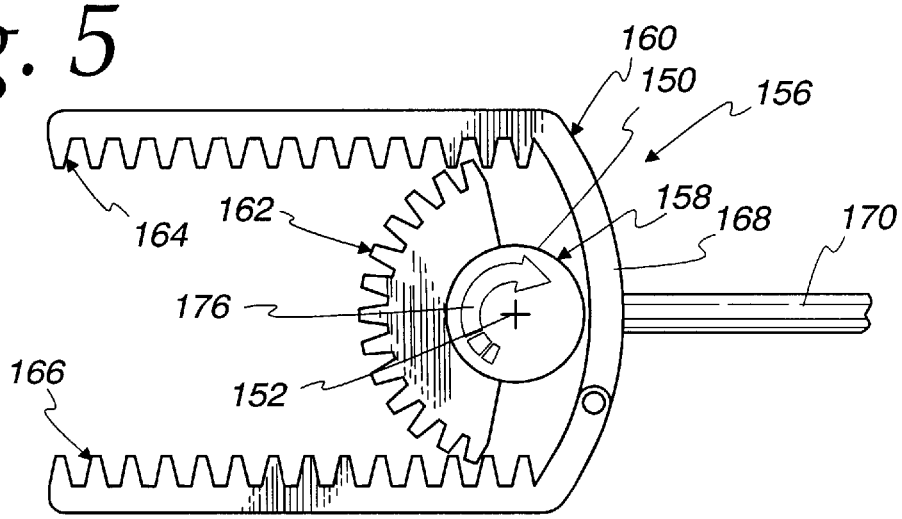
FIG. 5 is a view as in FIG. 3 with the oscillating assembly in a transition state at which point forward movement of the spool is initiated.
Figure 6:
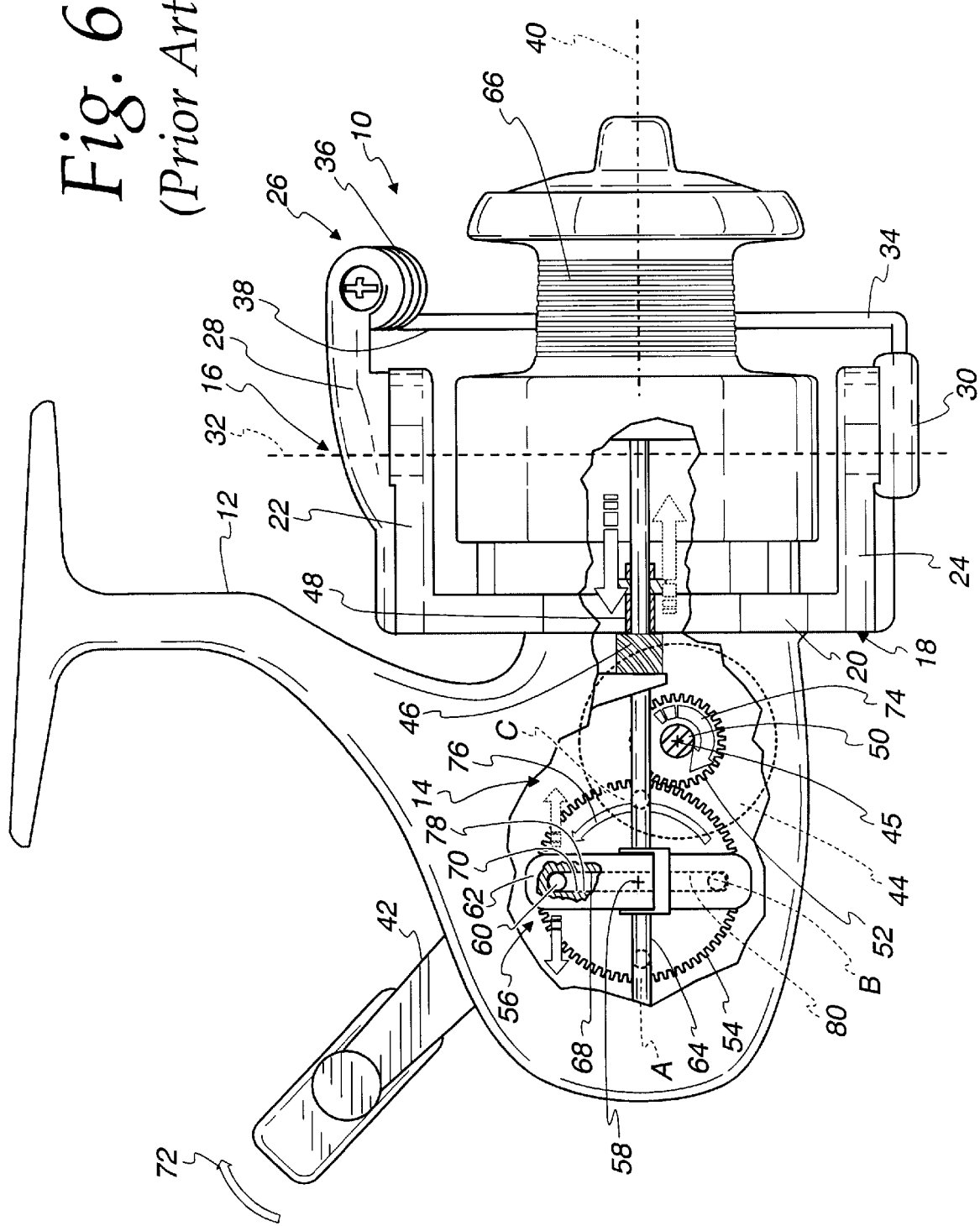
FIG. 6 is a side elevation view of a spinning-type fishing reel, as in FIG. 1, and incorporating a conventional spool oscillating assembly.

In FIG. 5, the gear elements 158, 160 are relatively positioned at a transition between rearward and forward movement of the second gear element 160. This defines one extreme of the spool "stroke". The other extreme of the stroke is realized with the first gear element 158 rotated approximately 180° from the FIG. 5 position therefor.

By reason of rotating the face gear 154 and first gear element 158 around the same axis 152, the oscillating assembly 156 lends itself to a relatively compact construction in a fore and aft direction. While it is not necessary that there be the fore-and-aft overlap of the first and second gear elements 158, 160 shown, it is desired that the axis 152 extend through the U shape defined cooperatively by the arm 168 and the first and second lines of gear teeth 164, 166, with the result being that at least one of the first and second lines of gear teeth 164,166 extends both forwardly and rearwardly beyond the axis 152 as the fishing reel 100 is operated.

Variations of the embodiment shown for the oscillating assembly 156 are contemplated. As one example, the teeth on the first and second lines of gear teeth 164, 166 could have a different pitch and could be laterally offset from each other. The first gear element 158 could have laterally stacked teeth portions with pitches to match those of the teeth on the first and second lines of gear teeth 164, 166. With this arrangement, different rates of forward and rearward movement of the line carrying spool 146 may occur for a constant rotational speed for the crank handle 148.

As a further variation, the transmission between the shaft 150 and the face gear 154 may be effected through multiple, smaller diameter gears, thereby obviating the need for the large diameter of the face gear 154 and the large frame compartment to accommodate the face gear 154.

The foregoing disclosure of specific embodiments is intended to be illustrative of the broad concepts comprehended by the invention.

What is claimed is:

1. A fishing reel comprising:
   a frame; and
   an operating mechanism on the frame comprising a line carrying spool that is guided reciprocatingly in a first path in first and second opposite directions, a bail assembly which is rotatable around a first axis to direct line onto the line carrying spool, a drive element that is operable to rotate the bail assembly, and an oscillating assembly,
   the oscillating assembly driven by operation of the drive element and thereby causing the line carrying spool to move reciprocatingly in the first path,
   the oscillating assembly comprising a first gear element that is rotatably driven by operation of the drive element around a second axis that is transverse to the first axis and a second gear element in mesh with the first gear element,
   the second gear element extending both a) in the first direction beyond the second axis and b) in the second direction beyond the second axis as the fishing reel is operated.

2. The fishing reel according to claim 1 wherein the line carrying spool is moveable in the first path parallel to the first axis. extends substantially parallel to the first axis.

3. The fishing reel according to claim 2 wherein the first axis is substantially orthogonal to the second axis.

4. The fishing reel according to claim 1 wherein the second gear element comprises a first line of gear teeth.

5. The fishing reel according to claim 4 wherein the first line of gear teeth extends substantially parallel to the first axis.

6. The fishing reel according to claim 4 wherein the second gear element comprises a second line of gear teeth spaced from the first line of gear teeth.

7. The fishing reel according to claim 6 wherein the first line of gear teeth and second line of gear teeth each extend substantially parallel to the first axis.

8. The fishing reel according to claim 6 wherein the first and second lines of gear teeth are connected by an arm so that the arm and first and second lines of gear teeth cooperatively define a U shape.

9. The fishing reel according to claim 6 wherein the first gear element comprises an array of teeth that extends in a curved path around the second axis through less than 360° around the second axis and the array of teeth alternatingly a) engages the first line of gear teeth and disengages the first line of gear teeth and b) engages the second line of gear teeth and disengages the second line of gear teeth as the first gear element rotates around the second axis, the first gear element engaged with the first line of gear teeth causing the line carrying spool to move in the first direction in the first path as the first drive gear is rotated in one direction around the second axis, the first gear element engaged with the second line of gear teeth causing the line carrying spool to move in the second direction in the first path as the first drive gear is rotated in the one direction around the second axis.

10. The fishing reel according to claim 4 wherein the first gear element comprises an array of teeth that repetitively engages and disengages the first line of gear teeth as the first gear element rotates around the second axis.

11. The fishing reel according to claim 10 wherein the first gear element comprises an array of teeth that extends in a curved path around the second axis through less than 360° around the second axis.

12. The fishing reel according to claim 1 wherein the first gear element comprises an array of gear teeth that extends through less than approximately 180° around the second axis.

13. The fishing reel according to claim 1 wherein the drive element comprises a crank handle that is engageable by a user and rotatable about an axis parallel to the second axis.

14. The fishing reel according to claim 13 wherein the axis about which the crank handle is rotatable is substantially coincident with the second axis.

15. The fishing reel according to claim 1 wherein the line carrying spool is moved in the first path only with the first gear element in mesh with the second gear element.

16. A fishing reel comprising:

a frame; and an operating mechanism on the frame comprising a line carrying spool that is guided reciprocatingly in a first path in first and second opposite directions, a bail assembly which is rotatable around a first axis to direct line onto the line carrying spool, a drive element that is operable to rotate the bail assembly, and an oscillating assembly, the oscillating assembly driven by operation of the drive element and thereby causing the line carrying spool to move reciprocatingly in the first path, the oscillating assembly comprising a first gear element that is rotatably driven by operation of the drive element around a second axis that is transverse to the first axis and a second gear element in mesh with a first set of gear teeth, the teeth on the first gear element engageable with the first set of gear teeth on the second gear element to cause the line carrying spool to move in the first direction in the first path and disengageable from the first set of gear teeth on the second gear element so that the line carrying spool is not caused to move in the first direction as the first drive gear is rotated in the one direction around the second axis.

17. The fishing reel according to claim 16 wherein the second gear element has a second set of gear teeth that is not contiguous with the first set of gear teeth, the teeth on the first gear element engageable with the second set of gear teeth on the second gear element with the teeth on the first gear element disengaged from the first set of gear teeth on the second gear element to cause the line carrying spool to move in the second direction in the first path.

18. The fishing reel according to claim 17 wherein the first and second sets of gear teeth on the second gear element are in fixed relationship to each other.

19. The fishing reel according to claim 18 wherein the first set of gear teeth extends along a first line and the second set of gear teeth extends along a second line spaced from and substantially parallel to the first line.

20. The fishing reel according to claim 19 wherein the first and second sets of gear teeth are connected by an arm so that the first and second sets of gear teeth and arm cooperatively define a U shape and the second axis extends through the U defined by the first and second sets of gear teeth and arm.

21. The fishing reel according to claim 16 where the first set of gear teeth extends along a line that is substantially parallel to the first axis.

22. The fishing reel according to claim 16 wherein the line carrying spool is moved in the first path only with the first gear element in mesh with the second gear element.

* * * * *